Nov. 12, 1963 D. J. SHRAMO ETAL 3,110,228
OSCILLATORY ACTUATOR SYSTEM
Filed Feb. 8, 1961 3 Sheets-Sheet 2

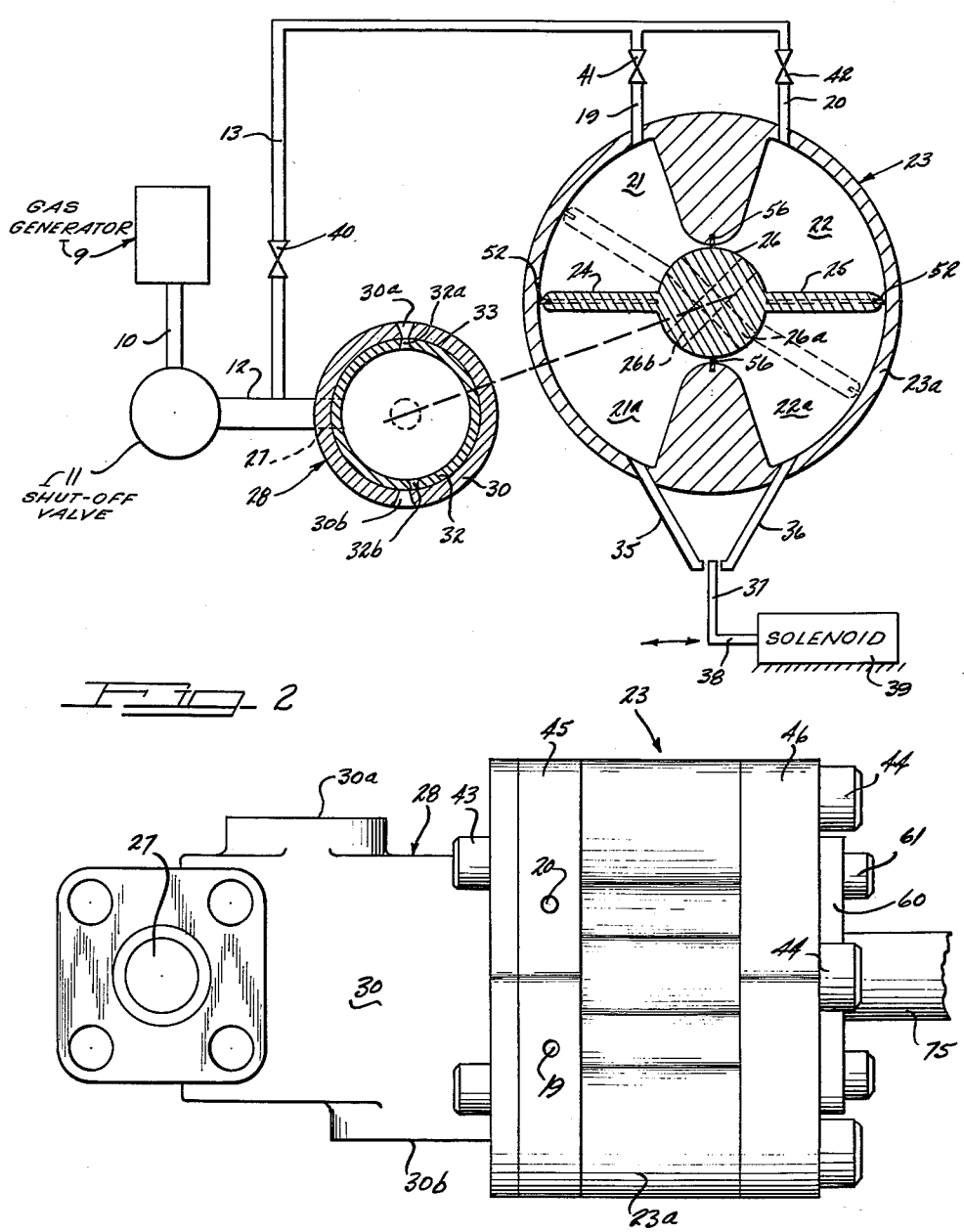

INVENTORS
Endre A. Mayor
Daniel J. Shramo
BY
ATTORNEYS

Nov. 12, 1963  D. J. SHRAMO ETAL  3,110,228
OSCILLATORY ACTUATOR SYSTEM
Filed Feb. 8, 1961  3 Sheets-Sheet 3
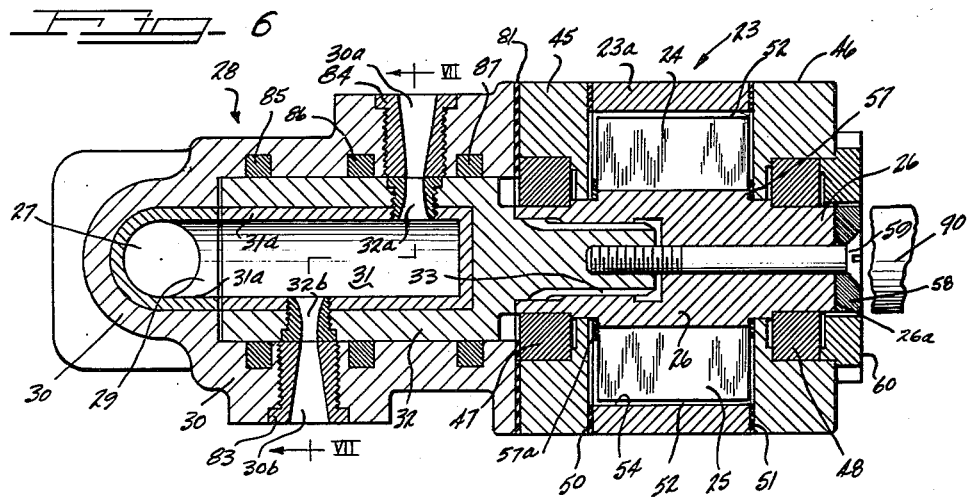
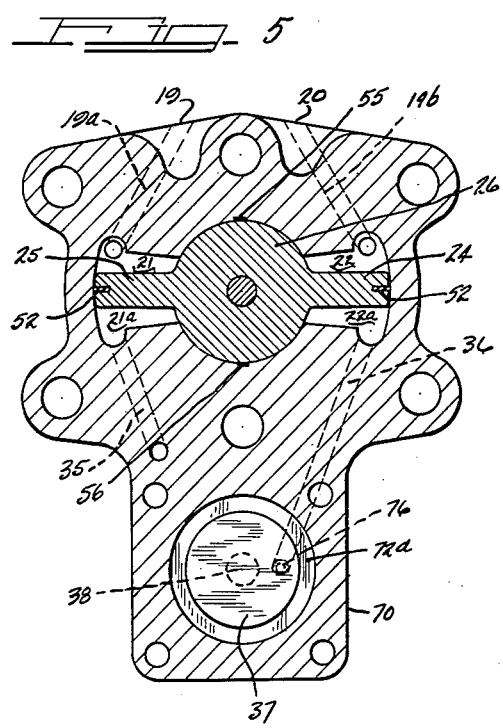
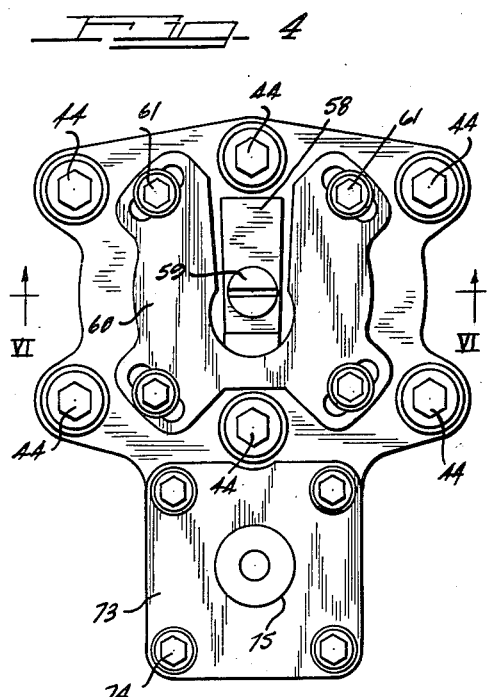
INVENTORS
Endre A. Mayor
Daniel J. Shramo
BY
ATTORNEYS

United States Patent Office

3,110,228
Patented Nov. 12, 1963

1

3,110,228
OSCILLATORY ACTUATOR SYSTEM
Daniel J. Shramo, Willoughby, and Endre A. Mayer, South Euclid, Ohio, assignors to Thompson Ramo Wooldridge Inc., Cleveland, Ohio, a corporation of Ohio
Filed Feb. 8, 1961, Ser. No. 87,836
8 Claims. (Cl. 91—43)

This invention relates to missiles, rockets and the like and is more particularly concerned with improved methods and means for minimizing the effects of pressure changes on operation of an oscillatory actuator system caused by movement of the actuator rotor in response to a pressure differential acting on the rotor vanes.

Heretofore, operational reliability of oscillatory actuators controlling devices for attitude control of missiles, rockets and the like has been of concern due to the effects of pressure gradients experienced in the gas generator and associated components employed to operate the actuator. The pressure gradients are caused primarily by oscillation of the actuator rotor in response to the actuator control mechanism.

The effects of these pressure gradients upstream of the actuator assembly vane compartments are particularly crucial when one utilizes the actuator for control of flight surfaces or gimbaled gas discharge nozzles of the propulsion system of the air or space-borne vehicle with which the actuator assembly is employed. The effects produced by the pressure changes include surges back into the actuator vane compartments and effects similar to "hydraulic hammer."

With the present invention, means are provided for minimizing the effects of pressure changes in a servo-actuator system.

It is therefore an object of the present invention to minimize the effects of pressure changes on operation of an oscillatory actuator utilized for actuating flight control surfaces and the like employed with air and space borne vehicles.

It is another object of the present invention to provide valve means for minimizing the effects of pressure changes on operation of an oscillatory actuator system.

It is still another object of the present invention to provide an improved unitary vane actuator and coupled valve assembly for controlling actuation of flight control surfaces of air and space borne vehicles.

It is a further object of the present invention to provide an improved rotor shaft including valving means for minimizing the effects of pressure changes in the vane chambers of an oscillatory actuator system.

It is a still further object of the present invention to provide nozzled valve means for minimizing the effects of pressure changes in the vane compartments of a rotary actuator.

It is another object of the present invention to provide a method for controlling the discharge gases emanating from a gas generator and employed to operate an oscillatory actuator system.

These and other objects, features and advantages of the present invention will become apparent upon a careful consideration of the following detailed description when considered in conjunction with the accompanying drawing illustrating a preferred embodiment of the present invention and wherein like reference numerals and characters refer to like and corresponding parts throughout the several views.

On the drawing:

FIGURE 1 is a generally schematic view of an actuator system constructed in accordance with the principles of the present invention.

2

FIGURE 2 is a top view in elevation of the unitary actuator and valve assembly of FIGURE 1.

FIGURE 4 is an end view in elevation of the assembly of FIGURE 3 taken along lines IV—IV.

FIGURE 5 is a cross-sectional view taken along lines V—V of FIGURE 3.

FIGURE 6 is a view in longitudinal section taken along lines VI—VI of FIGURE 4.

Figure 3:
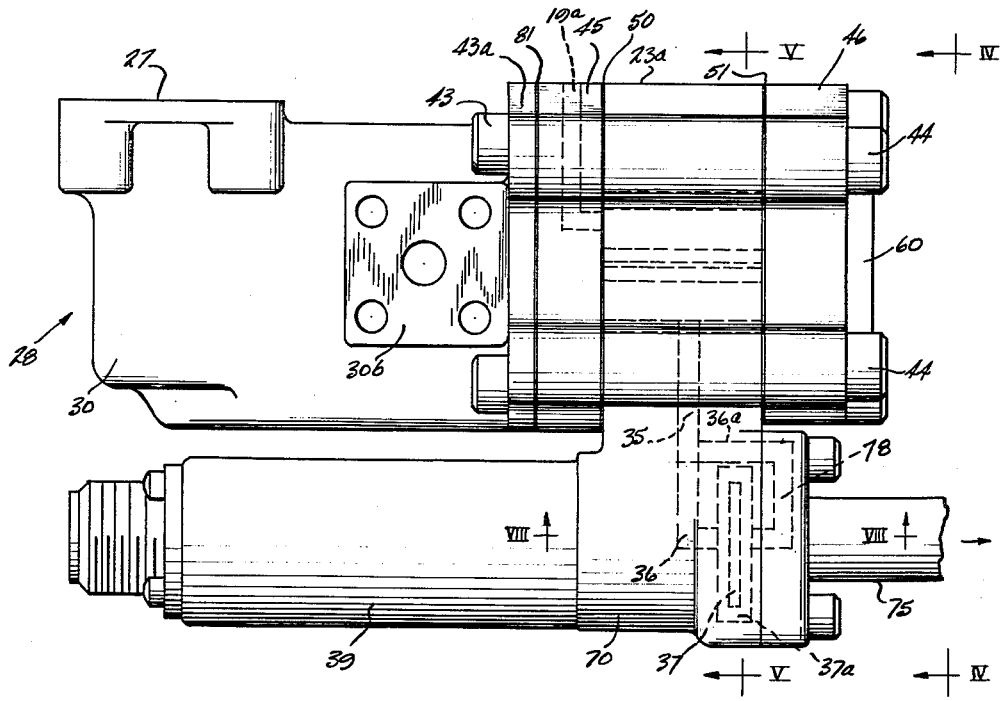
FIGURE 3 is a view in side elevation of the assembly of FIGURE 2.

Referring to FIGURE 1, an example of an embodiment of an actuator system constructed in accordance with the principles of the present invention may include a source of a pneumatic pressurizing medium, such as a gas generator generally indicated by the numeral 9 connected as by a conduit 10 and a shut-off valve 11 to a branch conduit 12 for supply of the pressurizing medium through a branch conduit 13 to a pair of conduits 19 and 20 connected by appropriate fittings (not shown) in communication with a pair of vane compartments 21 and 22 defined by the actuator assembly, generally designated by the numeral 23, and a pair of vanes 24 and 25 depending from the actuator rotor 26.

Branch conduit 12 communicates with a passage 27, indicated by the dotted lines formed in the valve assembly, generally designated by the numeral 28. Passage 27 is in communication with a passage 29 (FIGURE 6) formed in the housing 30 of the valve assembly. Passage 29 communicates with a generally cylindrical chamber 31 formed in a sleeve 32 which may be integral with the rotor shaft or, as shown on the drawing (FIGURE 6) may be splined as at 33 to the rotor shaft 26.

Figure 7:
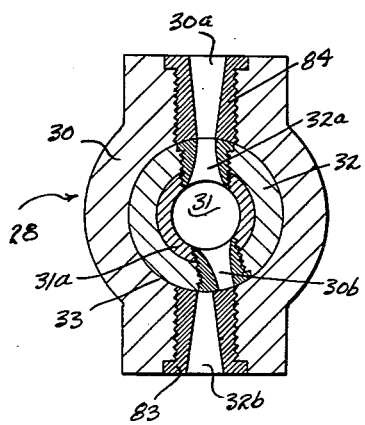
FIGURE 7 is a view in section taken along lines VII—VII of FIGURE 6.

Formed in the sleeve 32 are a pair of offset discharge nozzle portions 32a and 32b. Each of the nozzle portions 32a and 32b are sized to cooperate, when axially aligned respectively with a pair of nozzle portions 30a and 30b, to define a pair of discharge nozzle assemblies of the De Laval type. The nozzle portions 32a and 32b are relatively spaced so that when one of the nozzle portions, such as 32b, is axially aligned with the complementary nozzle portion 30b, communication between the nozzle portions 30a and 32a is prevented, and similarly, as shown in the drawing, when nozzle portion 32a is in axial alignment with the nozzle portion 30a communication between the nozzle portions 30b and 32b is prevented (FIGURE 7).

Each of the nozzle portions 30a and 32a, 30b and 32b, are sized so that the minimum cross-sectional area therebetween, when in axial alignment, is on the parting line 33 between the housing 30 and sleeve 32. So sizing the throat cross-sectional areas is considered a feature of the present invention in that the De Laval type nozzle assemblies defined by the nozzle portions may be considered in one respect as the gas discharge nozzles of the gas generator 9. As with any reaction motor employing a venturi discharge nozzle, the throat cross-sectional area thereof is of prime importance in determining gas generator burning pressure and in the avoidance of pressure pulses. In accordance with the practice of the present invention, the throats of the nozzles must be varied to minimize the effects of pressure differentials in the vane chambers on operation of the gas generator, i.e., burning pressure.

By employment of a pair of offset nozzle assembly portions formed in the oscillatory sleeve coupled to the rotor of the actuator unit, not only are the deleterious effects of pressure changes in the conduits 13, 19 and 20 minimized but the effects of these pressure changes on the gas generator burning pressure minimized in response to operation of the rotor 26. An additional feature of the present invention resides in the fact that the nozzle portions are sized relative to each other so that there is always defined thereby a total combined throat area which is constant during oscillation or switching of the sleeve 32 caused by movement of the rotor 26. Thus the total combined area defined by the two nozzles is constant and minimizes the effects of pressure pulses on the burning pressure in the gas generator while simultaneously minimizing the effects of pressure changes in the conduits 13, 19 and 20 and the attendant effects on the vanes 24 and 25 and rotor 26 in the actuator assembly 23.

To change the position of the rotor vanes 24 and 25 relative to the actuator housing 23a bleed outlets 35 and 36 are provided which communicate the vane compartments 21a and 22a respectively. The pressurizing medium may be introduced into compartment 22a from compartment 21 through a rotor formed passage 26a, and similarly the pressurizing medium may be introduced into compartment 21a from compartment 22 through a rotor formed passage 26b. The discharge ends of the bleed passages 35 and 36 may be spaced relative to each other so as to discharge against a member 37 carried by a reciprocating shaft 38 operatively responsive to a solenoid 39 of conventional construction. Reciprocation of the shaft 38 and corresponding movement of the member 37 to the left as viewed in FIGURE 1 will create a pressure differential in the communicating vane compartments and cause clockwise movement of the vanes 24 and 25 (FIGURE 1) and corresponding clockwise movement of the rotor and attached vehicle flight control surface or rotary component 90 shown broken away in FIGURE 6.

Similarly, movement of the member 37 to the right as viewed in FIGURE 1 will cause a corresponding pressure differential in the communicating vane compartments and cause movement of the vane, rotor and attached component in a counterclockwise movement.

Movement of the vanes, however, will cause variation in the pressure in the conduit 13. By coupling the sleeve 32 to the rotor 26 to cause movement thereof in the same direction, the effects of pressure changes in the line 13 on gas generator burning pressure may be minimized by varying the throat while maintaining the cross-sectional area of the gas generator throat (defined by the pair of cooperating nozzle portion assemblies 30a and 32a and 30b and 32b) constant during the switching operation. The sleeve 32 is coupled to the rotor 26 in such a manner that the total flow by-passed into the chamber 31 is always ported through one of the nozzle assemblies while the other nozzle assembly is closed when the actuator is in the null or inoperative position shown in FIGURE 1 and 5. In the embodiment shown in the drawings, the solenoid completely blocks communication with one or the other of the passages 35 and 36 and thus the system is a two position actuator, although it will be appreciated that the present invention finds application in multi-position actuator systems.

A fixed restriction 40 in line 13 may be employed to control the supply pressure of the pressurizing medium to the chambers of the actuator assembly 23. Similarly, restrictions 41 and 42 may be provided in branch conduits 19 and 20 for controlling flow of the pressurizing medium to the respective vane compartments 21 and 22.

A preferred embodiment of the oscillatory actuator system constructed in accordance with the present invention appearing in FIGURE 6 includes the sleeve assembly 28 secured to the actuator assembly 23 as by bolts 43 and 44 (FIGURE 3). The actuator assembly 23 comprises the vane chamber defining housing 23a and opposed end plates 45 and 46, each of which is centrally bored to permit passage therethrough of the actuator rotor 26 which is supported in the assembly by conventional bearings 47 and 48 respectively. Annular sealing gaskets 50 and 51 are provided to prevent leakage from the vane compartments along the parting line between the end plates and the vane compartment housing 23a.

Each of the vanes 24 and 25 may carry along its leading edge a seal 52 in wiping contact with the inner surface 54 of the vane compartment housing 23a. In FIGURE 5 linear strip seals 55 and 56 are shown seated in grooves formed in the actuator housing to prevent passage of the pressurizing medium from one vane compartment to the other around the rotor 26. At each end of the vanes, the rotor carries an annular seal ring 57 and 57a to prevent leakage from the vane compartment along the rotor shaft.

Connected at its end remote from the valve assembly 28, the rotor carries a member 58 which is secured thereto as by a bolt 59 which passes through the rotor and may be connected to maintain the valve sleeve 32 in axial alignment with the rotor 26. Member 58 is provided to limit the angle of oscillation of the rotor by abutment against a keyed and adjustable member 60 secured to the end plate 46 as by bolts 61. Thus by adjustment of the member 60 the angle of oscillation of the rotor in the vane compartments may be adjusted. The end 26a of the rotor is shown connected to a shaft of a flight control surface (FIGURE 6) indicated by numeral 90.

Figure 8:
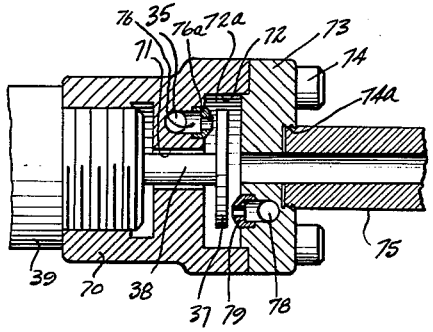
FIGURE 8 is a fragmentary view in partial section taken along lines VIII—VIII of FIGURE 3.

Communication between the conduits 19 and 20 and the vane compartments 21 and 22 is provided by a pair of passages 19a and 19b (FIGURE 5) formed in the end plate 45 (FIGURE 3). Discharge of the pressurizing medium from the chambers 21a and 22b, as aforesaid, is through the passages 35 and 36 (FIGURES 1 and 5). Formed integral with or connected to the vane housing 23a (FIGURE 3) is a fitting 70 adapted to receive in threaded engagement therewith (FIGURE 8) the solenoid 39. The fitting 70 is passaged as at 71 (FIGURE 8) for receiving the reciprocable shaft 38 of the solenoid which carries the flapper member 37. The fitting 70 is counterbored as at 72 to permit reciprocation of the member 37. A centrally apertured end plate 73 is secured as by bolts 74 to the fitting 70 and is provided with a centrally located bore 74a threaded to receive the exhaust conduit 75 which is thus in communication with the chamber 72a. The fitting 70 is passaged as at 76 in communication with the discharge passage 35 formed in the vane housing 23a. A nozzled outlet 76a is provided (FIGURE 8) to exhaust the discharge gases from the vane compartment 21a against the flapper valve 37 as appears in FIGURE 8. Similarly, the discharge passage 36 communicating with the vane compartment 22a is provided with a transverse leg 36a (FIGURE 3) for supply of the discharge gases through a U-shaped passage 78 formed in the end plate 73 to thereby supply the discharge gases against the flapper member 37 through a nozzle outlet 79 (FIGURE 8). Thus, with the flapper valve in the position shown in FIGURE 8, equi-distant between the outlets 76 and 79, the pressure conditions in the vane compartments are in equilibrium and the rotor retained relative to the housing in the position shown in FIGURES 1 and 5. If the valve 37 is moved to the left as viewed in FIGURE 8 blocking the discharge outlet 76, the rotor will move in a clockwise direction. Thus, means are provided for creating a pressure differential in the vane compartments of the actuator unit and thus controlling movement of the rotor in either a clockwise or counterclockwise direction. Movement of the valve 37 to the intermediate position shown in FIGURE 8 returns the rotor to the position shown in FIGURE 5.

It will be appreciated that employment of the external conduits 19 and 20 and the discharge fitting 70 minimize the heat exchange problem normally associated with actuators wherein the supply and discharge conduits are formed annularly in the actuator housing or rotor.

As aforementioned, the valve assembly 28 is connected to the actuator assembly by bolts 43 passing through a flange 43a carried by the valve housing 30. A gasket seal 81 may also be provided to prevent leakage of the pressurizing medium from the valve assembly and actuator assembly. The sleeve chamber 31 may be provided with a high temperature resistant liner 31a as may be the passage 29 communicating therewith. Similarly, the nozzle portions 30a and 30b may be formed of threaded inserts 83 and 84 constructed of high temperature resistant material, such as tungsten carbide, as may be the nozzle portions 32a and 32b. O-ring seals 85, 86 and 87 may be provided to prevent inter-nozzle and external leakage in addition to minimizing heating of the valve and actuator assemblies.

In operation, reciprocation of the member 37 in either direction to close the discharge outlets 76 and 79 will cause a corresponding movement of the rotor 26 in either a clockwise or counterclockwise direction. Movement of the rotor causes movement of the valve sleeve 32 coupled thereto in the same direction. Movement of the sleeve 32 will change the direction of flow of the pressurizing medium through the De Laval nozzle assemblies of the valve means 28 depending of course, upon which direction the rotor is moved. For purposes of the two position actuator system shown in the drawing, particularly FIGURE 1, movement of the member 37 would be limited from the equilibrium position shown in FIGURE 1 to the left as viewed in FIGURE 1 blocking nozzle 35 and positioning the rotor vanes as shown by the dotted lines. Of course, it would be appreciated that a plurality of nozzle portion assemblies may be provided for the valve assembly as may be a plurality of vanes on the rotor without departing from the scope of the present invention. The valve means 28 effectively minimizes the effects of pressure changes in the gas generator and associated components.

Although various minor modifications might be suggested by those versed in the art, it will be understood that we wish to embody within the scope of the patent warranted hereon all such embodiments as reasonably and properly come within the scope of our contribution to the art.

We claim as our invention:

1. An oscillatory actuator system comprising: a housing defining a chamber; a rotor supported for oscillation in the chamber; at least one vane on the rotor separating the chamber into at least a pair of pressurizable vane compartments; a source of a pressurizing medium; first conduit means for supplying the pressurizing medium to the vane compartments; second conduit means for discharge of the pressurizing medium from said vane compartments; means for varying pressure conditions in said second conduit means to thereby cause movement of the rotor relative to the housing, and valve means operatively responsive to movement of the rotor relative to the housing and connected to said first conduit means to control the pressure conditions in said first conduit means.

2. An oscillatory actuator system comprising: an actuator housing defining a chamber; a rotor supported for oscillation in the chamber; at least one vane on the rotor separating the chamber into at least a pair of pressurizable vane compartments; a source of a pressurizing medium; conduit means for supplying the pressurizing medium to the vane compartments; means for varying pressure conditions in the vane compartments to thereby cause movement of the rotor relative to the housing, and valve means operatively responsive to movement of the rotor for controlling pressure conditions in said conduit means, said valve means including a valve housing, a sleeve carried by the rotor in the valve housing and defining a chamber, means communicating the sleeve chamber and said conduit means, and at least a pair of nozzle assemblies comprising a pair of nozzle exit portions formed in the valve housing and a nozzle inlet portion formed in the valve sleeve for each of the nozzle exit portions, the nozzle inlet portions being spaced so that when the nozzle inlet portion and complementary nozzle exit portion of a nozzle assembly are axially aligned, the nozzle inlet portion of the other nozzle assembly is out of communication with the nozzle exit portion thereof.

3. An oscillator actuator system comprising: an actuator housing defining a chamber; a rotor supported for oscillation in the chamber; at least one vane on the rotor separating the chamber into at least a pair of pressurizable vane compartments; a source of a pressurizing medium; a main conduit connected to the source of pressurizing medium; a branch conduit connecting each of the vane compartments with the main conduit; a pressurizing medium discharge conduit for each of the vane compartments; signal responsive means for varying pressure conditions in said discharge conduits to thereby cause movement of the rotor relative to the housing; a valve housing; a sleeve carried by the rotor in the valve housing and defining a chamber; conduit means communicating the valve sleeve chamber and main conduit; spaced nozzle exit portions formed in the valve housing, and a spaced nozzle inlet portion formed in the valve sleeve for each of the nozzle exit portions, the nozzle inlet portions being spaced relative to the nozzle exit portions so that when a nozzle inlet portion and the complementary nozzle exit portion are axially aligned, the remaining nozzle inlet portions and nozzle exit portions are out of communication.

4. An oscillatory actuator assebly comprising: an actuator housing defining a chamber; a rotor supported for oscillation in the chamber; at least one vane on the rotor separating the chamber into at least a pair of pressurizable vane compartments; inlets formed in the actuator assembly for communicating each of the vane compartments with a main conduit connected to a source of a pressurizng medium; a discharge outlet for each of the vane compartments; signal responsive means for varying the pressure conditions in the discharge conduits to thereby cause movement of the rotor relative to the housing; a valve housing; a sleeve carried by the rotor in the valve housing and defining a chamber; an inlet for communicating the valve sleeve chamber and said main conduit for the pressurizing medium, and nozzle assemblies including spaced nozzle exit portions formed in the valve housing and complementary spaced nozzle inlet portions formed in the valve sleeve for each of the nozzle exit portions, the nozzle inlet portions being spaced relative to the nozzle exit portions so that when a nozzle inlet portion and the complementary nozzle exit portion are axially aligned, the remaining nozzle inlet portions and nozzle exit portions are out of communication.

5. An oscillatory actuator assembly comprising: an actuator housing defining a chamber; a rotor supported for oscillation in the chamber; at least one vane on the rotor separating the chamber into at least a pair of pressurizable vane compartments; inlets for introducing a pressurizing medium into the vane compartments from a main conduit connected to a source of pressurizing medium; a discharge outlet for each of the vane compartments; signal responsive means for varying pressure conditions in said discharge outlets to thereby cause movement of the rotor relative to the housing; a valve housing; a sleeve carried by the rotor in the valve housing and defining a chamber; an inlet communicating the valve sleeve chamber and main conduit, and nozzle assemblies including spaced nozzle exit portions formed in the valve housing and complementary spaced nozzle inlet portions formed in the valve sleeve for each of the nozzle exit portions, the nozzle inlet portions being spaced relative to the nozzle exit portions so that when a nozzle inlet portion and the complementary nozzle exit portion are axially aligned, the remaining nozzle inlet portions and nozzle exit portions are out of communication and the axially aligned nozzle assembly has its minimum cross-sectional throat area defined by the parting line between the valve housing and the valve sleeve and the total cross-sectional throat area of the nozzle assemblies remaining constant during the operation of the actuator.

6. A valve assembly adapted to control pressure conditions in the supply conduit means of an oscillatory actuator unit including a housing defining a chamber, a rotor supported for oscillation in the chamber having at least one vane thereon separating the chamber into at least a pair of pressurizable vane compartments and said rotor being operatively responsive to a differential pressure in the vane compartments to move relative to the housing, comprising: a valve housing, a sleeve in the housing and movable with the rotor, means for introducing a portion of the pressurizing medium from said supply conduit means into the chamber defined by the sleeve, and at least a pair of nozzle assemblies comprising a pair of nozzle exit portions formed in the valve housing and a nozzle inlet portion formed in the valve sleeve for each of the nozzle exit portions, the nozzle inlet portions being relatively spaced so that when the nozzle inlet portion and nozzle exit portion of a nozzle assembly are axially aligned, the nozzle inlet portion of the remaining nozzle assembly is out of communication with the complementary nozzle exit portion.

7. A valve assembly for controlling pressure conditions in the pressurizing medium supply conduit means of an oscillatory actuator unit including a housing defining a chamber, a rotor supported for oscillation in the chamber and having at least one vane thereon separating the chamber into at least a pair of pressurizable vane compartments, and means for varying pressure conditions in the vane compartments to thereby cause movement of the rotor relative to the housing, comprising: a valve housing, a sleeve in the housing movable with the rotor, an inlet communicating a chamber defined by the sleeve valve and the conduit means supplying the vane compartments with a pressurizing medium, and nozzle assemblies including spaced nozzle exit portions formed in the valve housing, and a complementarily spaced nozzle inlet portion formed in the valve sleeve for each of the nozzle exit portions, the nozzle inlet portions being spaced relative to the nozzle exit portions so that when a nozzle inlet portion and the complementary nozzle exit portion of a nozzle assembly are axially aligned, the remaining nozzle inlet portions and nozzle exit portions are out of communication and the said axially aligned nozzle assembly has its minimum cross-sectional throat area defined by the parting line between the valve housing and the valve sleeve.

8. The method of minimizing the effects of pressure changes in the pressurizing medium supply conduit means of an oscillatory actuator system including an actuator housing defining a chamber, a rotor supported for oscillation in the chamber having at least one vane thereon separating the chamber into at least a pair of pressurizable vane compartments, and means for varying pressure conditions in the vane compartments to thereby cause movement of the rotor relative to the housing, comprising: by-passing a portion of the pressurizing medium into a valve chamber defined by a valve sleeve movable with the rotor in a valve housing forming at least a pair of spaced nozzle exit portions in the valve housing and complementary nozzle inlet portions in the valve sleeve, and spacing the nozzle inlet portions so that when a nozzle exit portion is axially aligned with its complementary nozzle inlet portion, the remaining nozzle inlet portions and nozzle exit portions are out of communication.

References Cited in the file of this patent

UNITED STATES PATENTS

| 2,429,189 | Maddox | Oct. 14, 1947 |
| 2,928,409 | Johnson et al. | Mar. 15, 1960 |

FOREIGN PATENTS

| 854,278 | Germany | Nov. 4, 1952 |